E. H. GAMBLE.
THREE-COLOR PHOTOGRAPHY FOR PRINTING SURFACES, MAKING TRANSPARENCIES, AND THE LIKE.
APPLICATION FILED APR. 1, 1912.
1,102,902. Patented July 7, 1914.
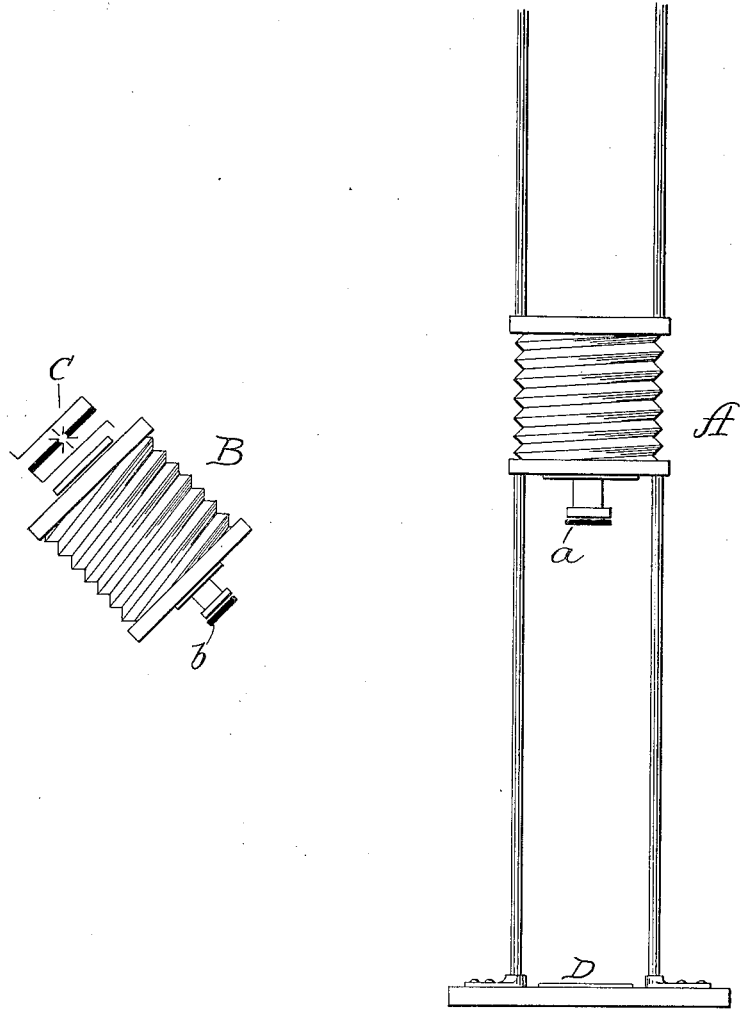
Attest.
Benton M. Stahl
H. L. Alden
Inventor.
Edward Henry Gamble.

UNITED STATES PATENT OFFICE.

EDWARD HENRY GAMBLE, OF LONDON, ENGLAND.

THREE-COLOR PHOTOGRAPHY FOR PRINTING-SURFACES, MAKING TRANSPARENCIES, AND THE LIKE.

1,102,902.　　　　　Specification of Letters Patent.　　Patented July 7, 1914.

Application filed April 1, 1912. Serial No. 687,831.

*To all whom it may concern:*

Be it known that I, EDWARD HENRY GAMBLE, a subject of the King of Great Britain and Ireland, and residing at Pine Grove, Tollington Park, London, N., England, have invented certain new and useful Improvements in Three-Color Photography for Printing-Surfaces, Making Transparencies, and the like, of which the following is a specification.

It is well known that in the process of three color photography as applied to the preparation of printing surfaces and the like the following difficulty is met with namely: When the red screen or light filter is used the resultant negative gives a relatively correct effect and the printing surface for use with the blue pigment is approximately correct. But in the case of the green light filter for the red pigment and of the blue-violet light filter for the yellow pigment the same relative correctness of result is not obtained. This incorrectness of result necessitates a certain amount of manual work by fine etching or other means to approximately rectify the error, and this necessity for manual correction has limited the application and usefulness of the three color process.

The object of my invention is to render this manual work with all its drawbacks, unnecessary, and to accomplish this result I proceed as follows: I first take a negative of the colored picture using an appropriate color screen or light filter and then project light on to the picture through this negative of itself and while the picture is thus illuminated I take the final negative for use in the production of printing surfaces or for other purposes. In taking this final negative I use an appropriate color screen or light filter as well as the special lighting described, and in addition to this special lighting I use other ordinary lighting at the same time or before, or after, and in varying degrees of strength. In this way negatives may easily be produced which will give correct color values for each of the three colors, red, yellow and blue, which are used in producing ordinary three color prints in pigments or dyes or the like on paper or on any other surface. This illuminating of the picture by light projected through the negative of itself has the effect of adding to those parts which otherwise would appear too dark in the final result, as much light as may be required to give the correct result. This correctness of color values enables the three color process to be more successfully applied to the lithographic, collotype, and intaglio methods of printing, which present greater difficulties in manual correction than the typographic method of printing.

I have illustrated the invention in the accompanying diagram. In this drawing I show the copy board adapted to support the picture at D. The copying camera is indicated at A with a color screen $a$. The second camera for taking the preliminary negative is shown at B having a color screen $b$, while C indicates an arc lamp for projecting the light onto the picture on the board D through the negative.

In carrying out my invention I proceed as follows: I focus the picture to the size required in a copying camera in the ordinary way. I then place another camera beside the copying camera. This second camera is so arranged that a projecting lantern can be placed behind it. I then focus the picture in this second camera, and take in it a negative of the picture using an appropriate color screen or light filter. Thus, when I am about to take the negative for use in producing the red printing plate, I take the negative in this second camera through a red screen or light filter. When this negative is developed and finished as usual I put it in the dark slide again and return it to its original position in the second camera. Then I place the projecting lantern in position behind the camera and project a stream of light through it. In order to avoid the necessity for a very long exposure a strong source of light such as an electric arc should be used, ordinary precautions (such as the use of a glass tank of water) being taken to prevent the heat from the lamp cracking the negative. This light illuminates those parts of the picture which in ordinary course would print too dark in the red printing plate, namely, the blue and green parts, and I regulate the strength of this light and its proportion to the other ordinary illumination so as to give to those parts just as much extra light as may be required to make them photograph with the required density. If the light projected through the negative overcorrects the blues and greens I increase the strength of the ordinary illumination. On the other hand it may be that the ordinary illumination is too bright and requires to be reduced, and the process thus allows of the most accurate adjustment of the light and consequent correction of the color values. I prefer to first darken the room and then project the light through the negative. The greens and blues are then almost certain to be overcorrected. The ordinary lighting may then be increased until the right effect is seen on looking at the picture through a green screen or light filter. The negative for use in the second camera should be clear and thin. When I have adjusted the strength of the two sources of light, I proceed to take a negative of the picture in the copying camera in the ordinary way using a green color filter as is usual in taking the negative for use in producing the red printing plate.

In some cases, such as in copying a dark painting, I use two or more cameras fitted with projecting lanterns, and project light on to the picture through a negative in each, and for special purposes, when I am using two or more such cameras I may use differently colored light filters in each camera, or I may use negatives which have been made through differently colored light filters. I may also vary the effect produced by using more than one negative in one projecting camera.

In making the final negative in the copying camera when the two sources of light are correctly adjusted, I may use a ruled or grained screen as is usual in process engraving.

I proceed in the same way in taking the negatives for use in producing the yellow and the blue printing plates except that for the yellow plate I use a green light filter in the second camera when taking the preliminary negative, and the usual blue-violet light filter in the copying camera when taking the final negative, and for the blue printing plate I use either a green or a blue-violet light filter in the second camera when taking the preliminary negative and the usual red light filter in the copying camera when taking the final negative.

As hereinbefore mentioned the color effect produced in the case of the red filter negative by the ordinary method is very nearly correct and therefore only a small proportion of the light should be projected while this negative is being made. It is advisable to place the second camera at such an angle to the picture that no reflections are produced in its surface when the light is projected on to it. An angle of about 45 degrees will usually accomplish this. The image will be distorted in consequence of the camera being placed at such an angle but in projecting the light on to the picture the distortion will be corrected as the optical conditions are the same in the projection as they were in taking the negative.

Having now described my invention what I claim as new and desire to secure by Letters Patent is:—

1. The hereindescribed process which consists in placing a colored picture in position to be photographed, illuminating said picture by light projected thereonto through a negative thereof and photographing said picture while so illuminated.

2. The hereinbefore described process which consists in placing a colored picture in position to be photographed, illuminating said picture by light projected thereonto through a negative thereof, illuminating the picture from other sources in the ordinary manner and then photographing the picture while so illuminated.

3. The hereinbefore described process consisting in placing a colored picture in position to be photographed, illuminating said picture by light projected thereonto through a negative thereof (the said negative having been taken through a lighting filter of appropriate color), and then photographing said picture through an appropriate colored screen or light filter while so illuminated, substantially as described.

In testimony whereof, I have affixed my signature in presence of two witnesses.

EDWARD HENRY GAMBLE.

Witnesses:
JOHN GETT,
HERBERT D. JAMESON.